US012352398B1

(12) United States Patent
Shao (10) Patent No.: US 12,352,398 B1
(45) Date of Patent: Jul. 8, 2025

(54) LIGHT-EMITTING DIODE LIGHT STRING WITH OPTICAL FIBER

(71) Applicant: Shu-Fa Shao, New Taipei (TW)

(72) Inventor: Shu-Fa Shao, New Taipei (TW)

( * ) Notice: Subject to any disclaimer, the term of this patent is extended or adjusted under 35 U.S.C. 154(b) by 0 days.

(21) Appl. No.: 18/937,176

(22) Filed: Nov. 5, 2024

(30) Foreign Application Priority Data

Oct. 9, 2024 (CN) .......................... 202411402039.6

(51) Int. Cl.
| | |
|---|---|
| F21S 4/10 | (2016.01) |
| F21V 8/00 | (2006.01) |
| F21Y 103/10 | (2016.01) |
| F21Y 115/10 | (2016.01) |

(52) U.S. Cl.
CPC .............. *F21S 4/10* (2016.01); *G02B 6/0008* (2013.01); *G02B 6/001* (2013.01); *F21V 2200/13* (2015.01); *F21V 2200/15* (2015.01); *F21V 2200/17* (2015.01); *F21Y 2103/10* (2016.08); *F21Y 2115/10* (2016.08)

(58) Field of Classification Search
CPC .... F21S 4/10; F21V 2200/13; F21V 2200/15; G02B 6/0008; G02B 6/001; G02B 6/005
See application file for complete search history.

(56) References Cited

U.S. PATENT DOCUMENTS

| | | | |
|---|---|---|---|
| 8,282,256 B1* | 10/2012 | Pike ..................... | G02B 6/0008 |
| | | | 362/555 |
| 12,099,227 B1* | 9/2024 | Schneider ............ | G02B 6/0006 |
| 2007/0159842 A1* | 7/2007 | Cole ........................ | F21S 4/10 |
| | | | 362/555 |
| 2012/0039070 A1* | 2/2012 | Shen ........................ | F21S 4/10 |
| | | | 362/249.02 |
| 2018/0245752 A1* | 8/2018 | Hendricks ............... | F21V 23/06 |
| 2021/0270429 A1* | 9/2021 | Shao ........................ | F21S 4/10 |
| 2024/0377575 A1* | 11/2024 | Matsunaga .......... | G02B 6/0068 |

* cited by examiner

*Primary Examiner* — William N Harris (74) *Attorney, Agent, or Firm* — United One Law Group LLC; Kongsik Kim; Jjhongwoo Peck (57) ABSTRACT

A light-emitting diode light string with an optical fiber includes a first wire, a second wire, a light-emitting diode, and an optical fiber. The light-emitting diode is connected in parallel between the first wire and the second wire, which has a light-emitting surface, and when activated, generates a light at the light-emitting surface to have a first brightness. The optical fiber has a light entering end, a side light exiting portion, and a light exiting end. The light entering end is connected to the light-emitting surface, and the light entering end, the light exiting end, and the light-emitting surface are substantially aligned with a plumb line. The light has a second brightness at the light exiting end, the light has a third brightness at the side light exiting portion, the first brightness is substantially equal to the second brightness, and the second brightness is greater than the third brightness.

10 Claims, 8 Drawing Sheets

LIGHT-EMITTING DIODE LIGHT STRING WITH OPTICAL FIBER

CROSS-REFERENCE TO RELATED APPLICATION

This application claims priority from Chinese Application No. 202411402039.6 filed on Oct. 9, 2024, which is incorporated herein by reference in its entirety.

BACKGROUND

1. Technical Field

The present invention relates to a light-emitting diode light string with an optical fiber, and in particular, to a light-emitting diode light string with an optical fiber in which a light of a light-emitting diode is conducted through an optical fiber.

2. Related Art

Currently, to save power, most conventional light strings have replaced tungsten bulbs with light-emitting diodes. A conventional light string method is to solder light-emitting diodes to a wire, and control the light-emitting diodes on the wire through a control circuit. However, when an environment is arranged with a conventional light string, obstacles in the environment may block some light-emitting diodes of the light string, resulting in reduction of the overall brightness of the light string. For example, when the light string is hung on a Christmas tree, leaves or ornaments of the Christmas tree usually block most of the light-emitting diodes, affecting the overall visual effect of light emission of the light string. In addition, currently, to resolve the brightness reduction of the light string caused by blocking, an existing solution is to increase a quantity of light-emitting diodes on the light string. However, increasing the quantity of light-emitting diodes not only increases power consumption, but also leads to higher costs, making the product less competitive in the market.

In addition, to increase the visual effect of the light-emitting diode, the conventional light string has a housing arranged outside the light-emitting diode. However, the additional housing is not conducive to light transmission, and even a transparent housing reduces energy of the light, resulting in a lack of visual brightness or affecting the color of the light.

SUMMARY

In view of this, in some embodiments, a light-emitting diode light string with an optical fiber is provided, including a first wire, a second wire, a light-emitting diode, an optical fiber, and a light-transmitting colloid. The light-emitting diode is connected in parallel between the first wire and the second wire. The light-emitting diode has a light-emitting surface, and when activated, generates a light at the light-emitting surface to have a first brightness. The optical fiber has a light entering end, a light exiting end, and a side light exiting portion. The light entering end is connected to the light-emitting surface, and the light entering end, the light exiting end, and the light-emitting surface are substantially aligned with a plumb line. The light has a second brightness at the light exiting end, the light has a third brightness at the side light exiting portion, the first brightness is substantially equal to the second brightness, and the second brightness is greater than the third brightness.

In some embodiments, the optical fiber has a plurality of optical structures, each of the optical structures is located at the light exiting end, and the light passes through the plurality of optical structures to form a scattered light.

In some embodiments, the optical fiber has a plurality of optical structures, each of the optical structures is located at the side light exiting portion, and the light passes through the plurality of optical structures to form a scattered light.

In some embodiments, the side light exiting portion has a first groove and a second groove, and the first groove is parallel to the second groove.

In some embodiments, the side light exiting portion has a first groove and a second groove, and the first groove intersects the second groove.

In some embodiments, the light exiting end has a convex surface and a concave surface, and the concave surface faces the light-emitting surface.

In some embodiments, a plurality of optical fibers are provided, and the light entering end of each of the optical fibers is connected to the light-emitting surface.

In some embodiments, the light-emitting diode light string with an optical fiber further includes a light-transmitting colloid, where the light-transmitting colloid bonds the light entering end to the light-emitting surface. The light-transmitting colloid includes a first end and a second end, the first end is located at the light entering end, the second end is substantially aligned with the light exiting end, and a diameter of the first end is less than a diameter of the second end; and each of the optical fibers is arranged radially on the light-emitting surface.

In some embodiments, the plurality of optical fibers include a first optical fiber and a second optical fiber, and a length of the first optical fiber is greater than a length of the second optical fiber.

In some embodiments, the light-transmitting colloid has a first end and a second end, the first end is adjacent to the light entering end, the second end is located between the light entering end and the light exiting end, each of the optical fibers has a vertical section and a curled section, the vertical section is adjacent to the light entering end, and the curled section is adjacent to the light exiting end.

In some embodiments, the light exiting end is connected to a light-transmitting member, and an area of the light-transmitting member is greater than an area of the light exiting end.

In conclusion, in some embodiments, a light-emitting diode light string with an optical fiber connects an optical fiber to light-emitting diodes, so that the light of the light-emitting diodes can be conducted through the optical fiber to extend a light exiting position. Therefore, under a same light-emitting effect (visual brightness), compared with a conventional light string, the light-emitting diode light string with an optical fiber extends the light exiting position, so as to prevent obstacles from blocking the light of some of the light-emitting diodes, thereby increasing the overall brightness in an arranged environment. In this way, compared with the conventional light string, the light-emitting diode light string with an optical fiber can reduce a total quantity of light-emitting diodes, to reduce costs and power consumption. In the light-emitting diode light string in some embodiments, an optical fiber with a small diameter may alternatively be arranged in the light-emitting diode. Therefore, the light-emitting diode light string with an optical fiber can generate a variable light-emitting effect by changing a quantity, shapes, or lengths of the optical fibers.

The following describes the present invention in detail with reference to the accompanying drawings and specific embodiments, but is not intended to limit the present invention.

DETAILED DESCRIPTION

The following describes the technical solutions of the present invention in detail with reference to the accompanying drawings and specific embodiments to further understand the objective, solutions, and effects of the present invention, but is not intended to limit the protection scope of the appended claims of the present invention.

Figure 1:
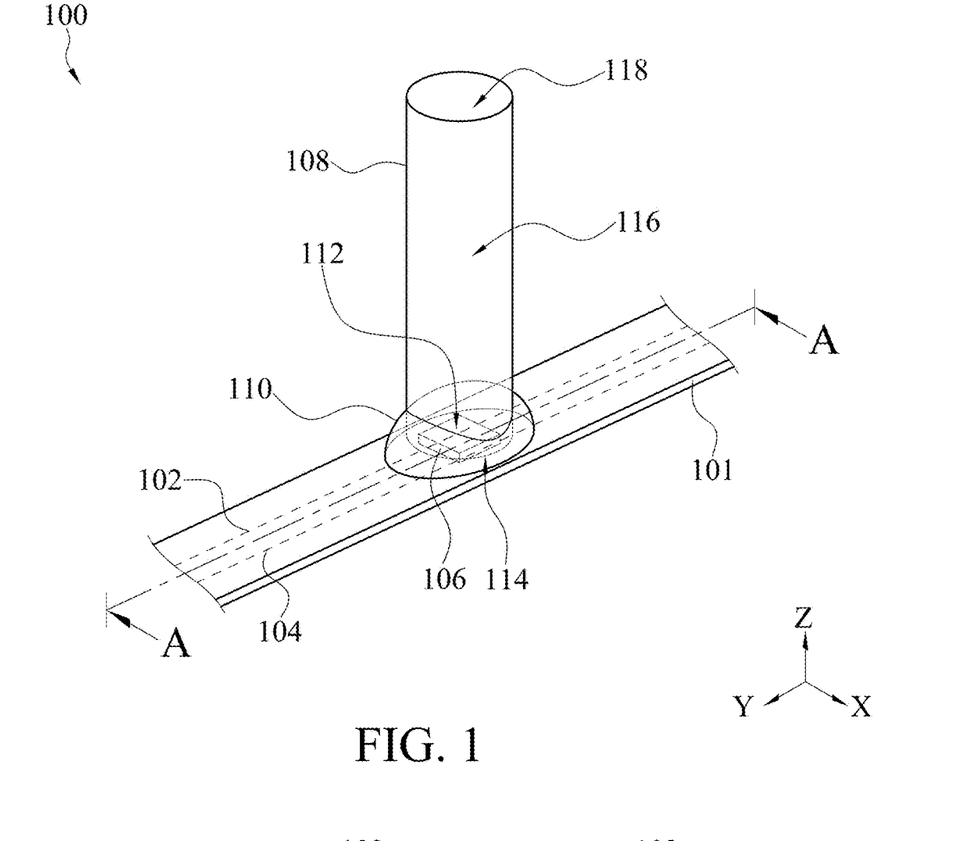
FIG. 1 is a three-dimensional view of a light-emitting diode light string with an optical fiber according to some embodiments of the present invention.
Figure 2:
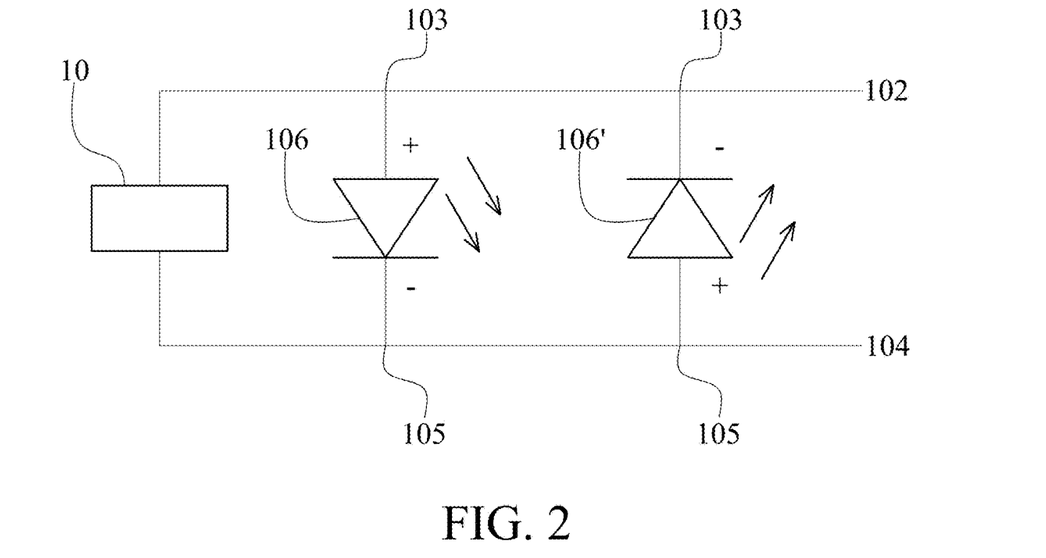
FIG. 2 is a circuit diagram of a light-emitting diode light string with an optical fiber according to some embodiments of the present invention.
Figure 3:
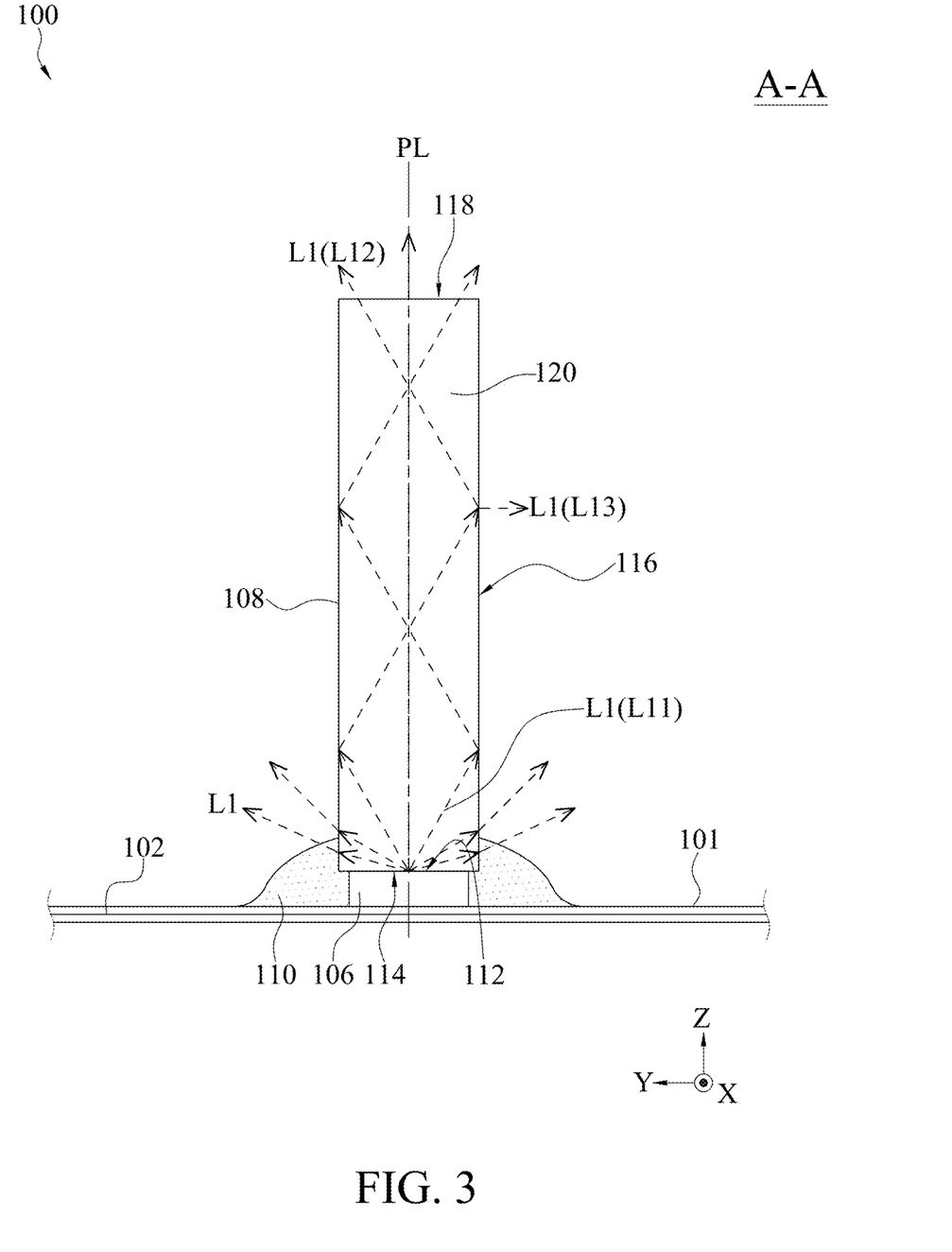
FIG. 3 is a cross-sectional view of FIG. 1 in a direction A-A.

Referring to FIG. 1, FIG. 2, and FIG. 3 together, FIG. 1 is a three-dimensional view of a light-emitting diode light string with an optical fiber according to some embodiments of the present invention. FIG. 2 is a circuit diagram of a light-emitting diode light string with an optical fiber according to some embodiments of the present invention. FIG. 3 is a cross-sectional view of FIG. 1 in a direction A-A. In some embodiments, as shown in FIG. 1, FIG. 2, and FIG. 3, a light-emitting diode light string 100 with an optical fiber includes a first wire 102, a second wire 104, a light-emitting diode 106, and an optical fiber 108. The light-emitting diode 106 is connected in parallel between the first wire 102 and the second wire 104. The light-emitting diode 106 has a light-emitting surface 112. When activated, the light-emitting diode 106 generates a light L1 at the light-emitting surface 112 to have a first brightness. The optical fiber 108 has a light entering end 114, a side light exiting portion 116, and a light exiting end 118. The light entering end 114 is connected to the light-emitting surface 112. The light entering end 114, the light exiting end 118, and the light-emitting surface 112 are substantially aligned with a plumb line PL. The light L1 has a second brightness at the light exiting end 118, the light L1 has a third brightness at the side light exiting portion 116, the first brightness is substantially equal to the second brightness, and the second brightness is greater than the third brightness.

In some embodiments, the light-emitting diode light string 100 with an optical fiber further includes a light-transmitting colloid 110. That the light entering end 114 is connected to the light-emitting surface 112 may be that the light-transmitting colloid 110 directly bonds the light entering end 114 to the light-emitting surface 112. Alternatively, one end of a transparent sleeve tube (not shown in the figure) may be connected to the light-emitting diode 106, and the other end is connected to the optical fiber 108, so that the optical fiber 108 is indirectly fixed to the light-emitting diode 106, and the light entering end 114 is in contact with the light-emitting surface 112.

The first wire 102 and the second wire 104 are used to receive power or an activation signal, so that the first wire 102, the second wire 104, and the light-emitting diode 106 form a loop. The first wire 102 and the second wire 104 may be wrapped in an insulating sheath 101, so that the first wire 102 and the second wire 104 can be hung on an arrangement object (described below). In some embodiments, the light-emitting diode 106 may alternatively be connected to a plurality of wires (including the first wire 102 and the second wire 104) or in a loop formed by a plurality of wires.

The light-emitting diode 106 may be a micro light emitting diode, an organic light emitting diode (OLED), a quantum dot light emitting diode (QLED), a mini light emitting diode (Mini LED), or a polymer light emitting diode (PLED). In some embodiments, the light-emitting diode 106 has a first polarity portion 103 and a second polarity portion 105. The light-emitting diode 106 may be connected to the first wire 102 by using the first polarity portion 103, and connected to the second wire 104 by using the second polarity portion 105. Alternatively, the first polarity portion 103 may be connected to the second wire 104, and the second polarity portion 105 may be connected to the first wire 102. In some embodiments, the light-emitting diode 106 may be arranged between the first wire 102 and the second wire 104 in a single light-emitting color. Alternatively, the light-emitting diode 106 may be sequentially arranged between the first wire 102 and the second wire 104 in a plurality of light-emitting colors, so that the light-emitting diode light string 100 with an optical fiber generates different visual effects.

The light-transmitting colloid 110 may be, for example, a photo-curable adhesive. The light-transmitting colloid 110 may be coated on the light-emitting surface 112 before being cured, so that the optical fiber 108 may be inserted into the light-transmitting colloid 110 at the light entering end 114 and come into contact with the light-emitting surface 112. Then, after an ultraviolet light is irradiated on the light-transmitting colloid 110, the adhesive light-transmitting colloid 110 is cured, so that the optical fiber 108 is fixed on the light-emitting surface 112.

In some embodiments, after the first wire 102 and the second wire 104 are connected to a control circuit 10, the control circuit 10 may transmit the activation signal to the first wire 102 or the second wire 104, so that the light-emitting diode 106 may generate the light L1 according to the activation signal. In addition, the light-emitting diode light string 100 with an optical fiber may be provided with light-emitting diodes 106 with different polarities. For example, as shown in FIG. 2, a polarity of the light-emitting diode 106 is opposite to a polarity of the light-emitting diode 106'. When the control circuit 10 outputs a high potential on the first wire 102 and a low potential on the second wire 104, the light-emitting diode 106 may be activated to emit light, and the light-emitting diode 106' does not emit light. Conversely, when the control circuit 10 outputs a low potential on the first wire 102 and a high potential on the second wire 104, the light-emitting diode 106 does not emit light and the light-emitting diode 106' emits light.

A fiber core 120 is provided between the light entering end 114, the side light exiting portion 116, and the light exiting end 118 of the optical fiber 108, and the fiber core 120 has a first refractive index. The side light exiting portion 116 surrounds a side surface of the fiber core 120 and has a second refractive index. The first refractive index is greater than the second refractive index. As shown in FIG. 3, a part of the light L1 may undergo total internal reflection in the fiber core 120, so that the light L1 is transmitted to the light exiting end 118 through the fiber core 120, to be emitted to the outside of the optical fiber 108. Another part of the light L1 may pass through the side light exiting portion 116 to be emitted to the outside of the optical fiber 108. A brightness of the light-emitting surface 112 (for example, a brightness of a light L11 in FIG. 3) is substantially equal to a brightness of the light exiting end 118 (for example, a brightness of a light L12 in FIG. 3), and the brightness of the light exiting end 118 is greater than a brightness of the side light exiting portion 116 (for example, a brightness of a light L13 in FIG. 3). Therefore, the light-emitting surface 112, the side light exiting portion 116, and the light exiting end 118 may present light-emitting effects of different brightnesses. As shown in FIG. 3, a height of the optical fiber 108 (a distance from the light entering end 114 to the light exiting end 118 in a Z-axis direction in FIG. 3) is greater than a height of the light-emitting diode 106 (a distance from the light-emitting surface 112 to the insulating sheath 101 in the Z-axis direction in FIG. 3). Therefore, the light L1 may extend a light exiting position through the optical fiber 108 (described below in FIG. 4). In addition, the optical fiber 108 transmits light energy with low loss, so that the brightness of the light exiting end 118 is substantially equal to the brightness of the light-emitting surface 112, to maintain the color and the brightness of the light L1, and maintain a light-emitting effect of the light L1 to a maximum extent.

Figure 4:
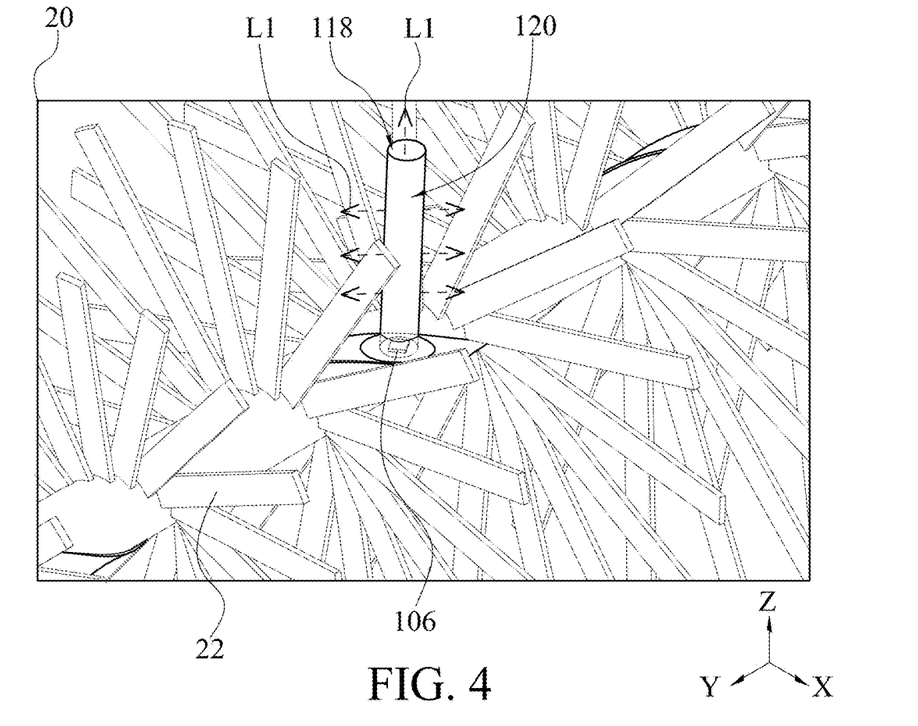
FIG. 4 is a schematic diagram of use of a light-emitting diode light string with an optical fiber according to some embodiments of the present invention, showing a use state of the light-emitting diode light string with an optical fiber arranged on an arrangement object.

Referring to FIG. 4, FIG. 4 is a schematic diagram of use of a light-emitting diode light string with an optical fiber according to some embodiments of the present invention, showing a use state of the light-emitting diode light string with an optical fiber arranged on an arrangement object. An arrangement object 20 shown in the figure may be a Christmas tree. In some embodiments, as shown in FIG. 4, after the light-emitting diode light string 100 with an optical fiber is arranged on the arrangement object 20, the optical fiber 108 is exposed between leaves 22 of the Christmas tree. When the light-emitting diode 106 is activated, a part of the light L1 is emitted to the outside of the optical fiber 108 through the light exiting end 118, so that the part of the light L1 can emit light around the arrangement object 20 (Christmas tree) without being blocked by the leaves 22. A length of the optical fiber 108 may be determined according to a length of the leaves 22 (or another obstacle). For example, the length of the optical fiber 108 is designed to be greater than or equal to the length of the leaves 22. When the light-emitting diode light string 100 with an optical fiber is viewed from a long distance of the arrangement object 20, more light L1 can be visually captured. Compared with the light-emitting diode light string 100 with an optical fiber, when the conventional light string emits light, most of the light L1 is blocked by the leaves 22 and appears dim. Therefore, under the same light-emitting effect (visual brightness), the light-emitting diode light string 100 with an optical fiber can reduce a total quantity of light-emitting diodes 106 compared with the conventional light string. For example, the conventional light string uses 1500 light sources (such as light-emitting diodes), and the same visual effect (which may be brightness) may be achieved by arranging 800 light-emitting diodes 106 in the light-emitting diode light string 100 with an optical fiber. It should be noted that only a single light-emitting diode 106 is used as an example in FIG. 4. In the light-emitting diode light string 100 with an optical fiber, the length of the wire (102, 104) may be alternatively increased or shortened according to requirements, and the light-emitting diodes 106 are arranged at intervals according to the length of the wire (102, 104), to increase the light-emitting effect and a light-emitting range.

Figure 5:
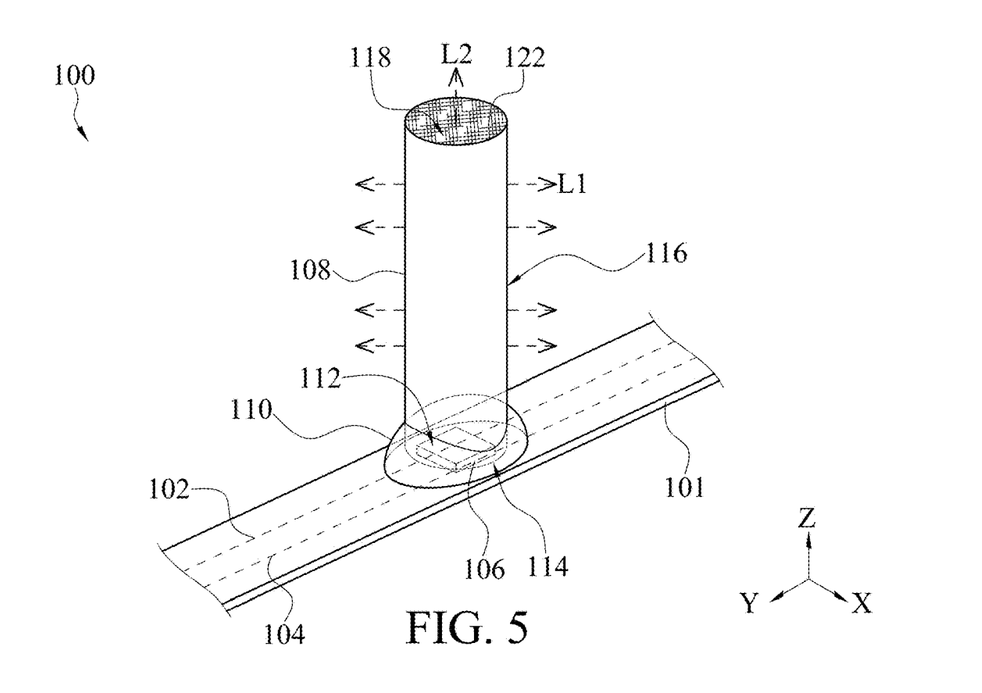
FIG. 5 is a three-dimensional view of a light-emitting diode light string with an optical fiber according to some embodiments of the present invention, showing a microstructure being located at a light exiting end.

Referring to FIG. 5, FIG. 5 is a three-dimensional view of a light-emitting diode light string with an optical fiber according to some embodiments of the present invention, showing a micro-structure being located at a light exiting end. In some embodiments, as shown in FIG. 5, the optical fiber 108 has a plurality of optical structures 122. Each of the optical structures 122 is located at the light exiting end 118. The light L1 passes through the plurality of optical structures 122 to form a scattered light L2. The scattered light L2 visually presents a dispersed and uniform soft effect compared with the light L1 under a scattering effect of the optical structures 122. The optical structure 122 may be a regular and/or irregular concave-convex structure, a cut, or a matt surface. The regular and/or irregular concave-convex structure may be made on the light exiting end 118 by using a surface processing technology (for example, grinding or friction), so that the optical structure 122 has an effect such as optical refraction or scattering (for example, forming a matt surface).

Figure 6:
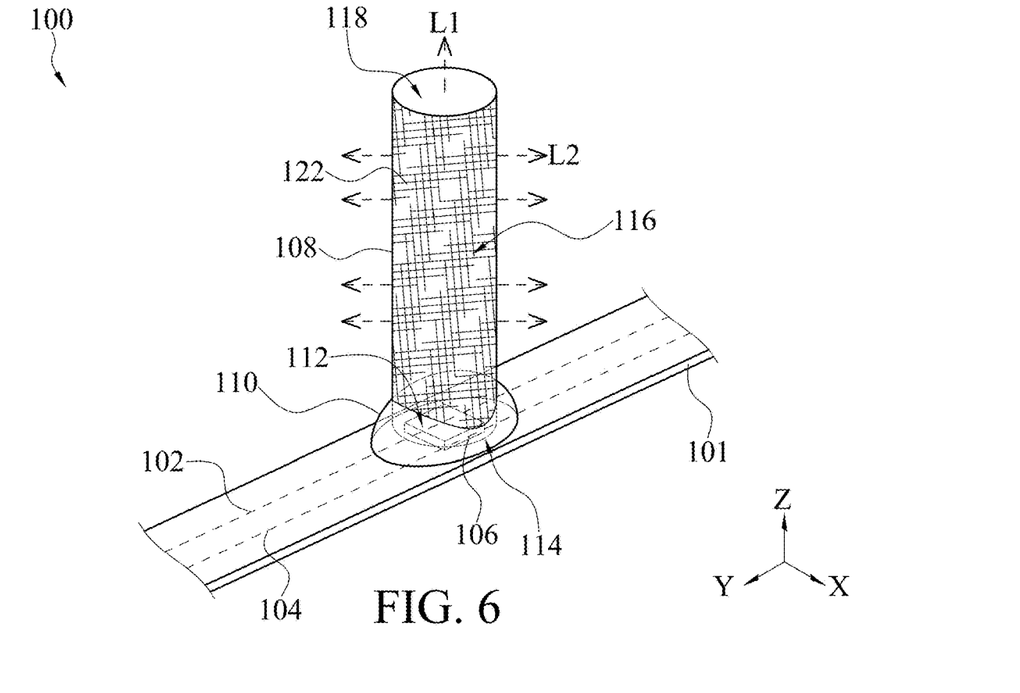
FIG. 6 is a three-dimensional view of a light-emitting diode light string with an optical fiber according to some embodiments of the present invention, showing a microstructure being located at a side light exiting portion.

Referring to FIG. 6, FIG. 6 is a three-dimensional view of a light-emitting diode light string with an optical fiber according to some embodiments of the present invention, showing a micro-structure being located at a side light exiting portion. In some embodiments, as shown in FIG. 6, the optical structure 122 may alternatively be located at the side light exiting portion 116, and the light L1 passes through the optical structure 122 of the side light exiting portion 116 to form a scattered light L2. A structure of the optical structure 122 in FIG. 5 is similar to a structure of the optical structure 122 in FIG. 6, and reference may be made to the description of the optical structure 122 in FIG. 5.

In some embodiments, as shown in FIG. 5 and FIG. 6, the optical structure 122 may alternatively be located at both the side light exiting portion 116 and the light exiting end 118 (not shown in the figure). Therefore, when the light L1 exits the optical fiber 108 at the side light exiting portion 116 and the light exiting end 118, the entire light L1 of the optical fiber 108 can visually present a dispersed and uniform optical effect.

Figure 7:
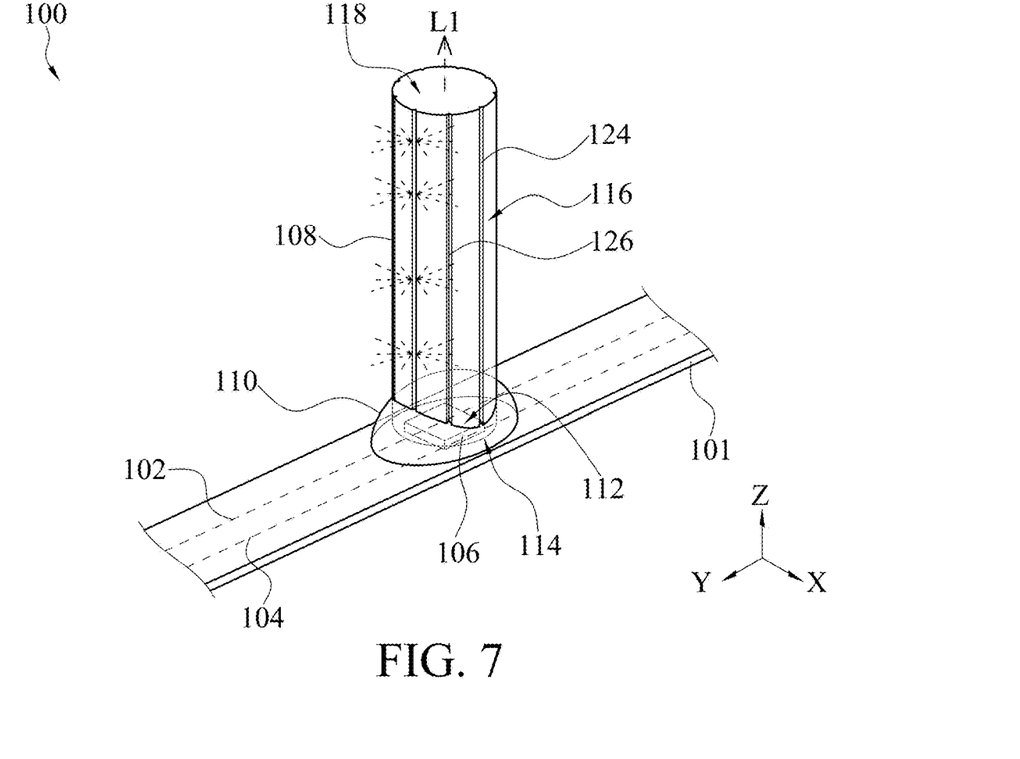
FIG. 7 is a three-dimensional view of a light-emitting diode light string with an optical fiber according to some embodiments of the present invention, showing a groove of a side light exiting portion being in a longitudinal direction.
Figure 8:
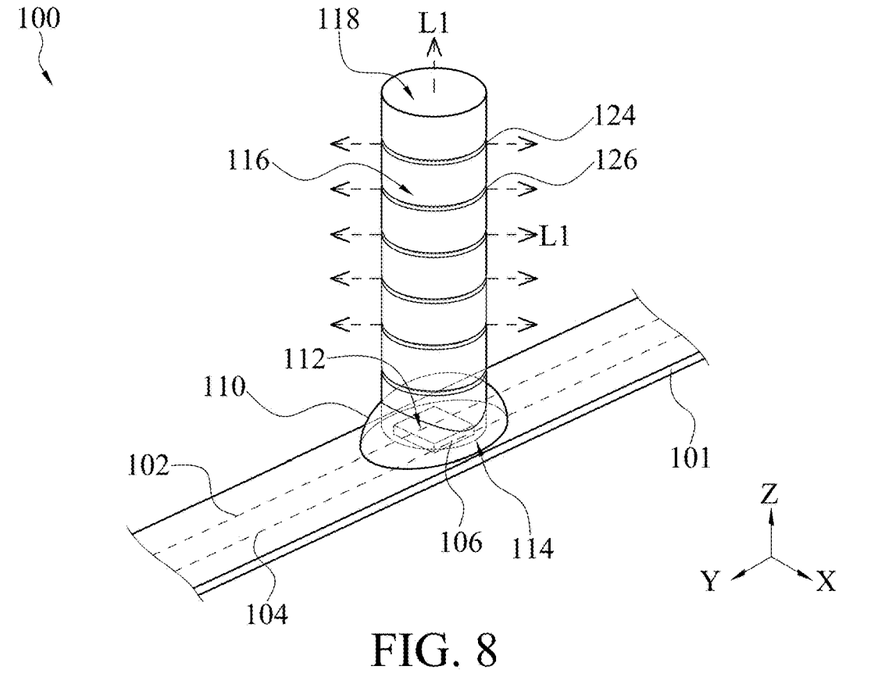
FIG. 8 is a three-dimensional view of a light-emitting diode light string with an optical fiber according to some embodiments of the present invention, showing a groove of a side light exiting portion being in a transverse direction.

Refer to FIG. 7 and FIG. 8 together. FIG. 7 is a three-dimensional view of a light-emitting diode light string with an optical fiber according to some embodiments of the present invention, showing a groove of a side light exiting portion being in a longitudinal direction. FIG. 8 is a three-dimensional view of a light-emitting diode light string with an optical fiber according to some embodiments of the present invention, showing a groove of a side light exiting portion being in a transverse direction. In some embodiments, as shown in the light-emitting diode 106 in FIG. 7 or FIG. 8, the side light exiting portion 116 of the light-emitting diode 106 has a first groove 124 and a second groove 126, and the first groove 124 is parallel to the second groove 126. When the light L1 passes through the side light exiting portion 116, the light L1 irradiated on the groove (124, 126) changes a traveling direction on the groove (124, 126), so that the light L1 is refracted and focused on the groove (124, 126), and more light L1 is emitted at the groove (124, 126), and a plurality of light bars are formed on the optical fiber 108. For example, as shown in the light-emitting diode 106 in FIG. 7, two ends of the first groove 124 and the second groove 126 respectively extend in the light entering end 114 and the light exiting end 118, so that the groove 126 extends according to the traveling direction of the light L1 (that is, the Z-axis direction in FIG. 7). Therefore, when the light L1 passes through the side light exiting portion 116, the entire optical fiber 108 can visually present an optical effect of longitudinal light stripes. Further, as shown in the light-emitting diode 106 in FIG. 8, the first groove 124 and the second groove 126 surround the side light exiting portion 116 respectively, and there is a spacing distance between the first groove 124 and the second groove 126. Therefore, the first groove 124 and the second groove 126 may be stacked on the side light exiting portion 116 at the spacing distance. When the light L1 passes through the side light exiting portion 116, the entire optical fiber 108 can visually present an optical effect of transverse light stripes.

Figure 9:
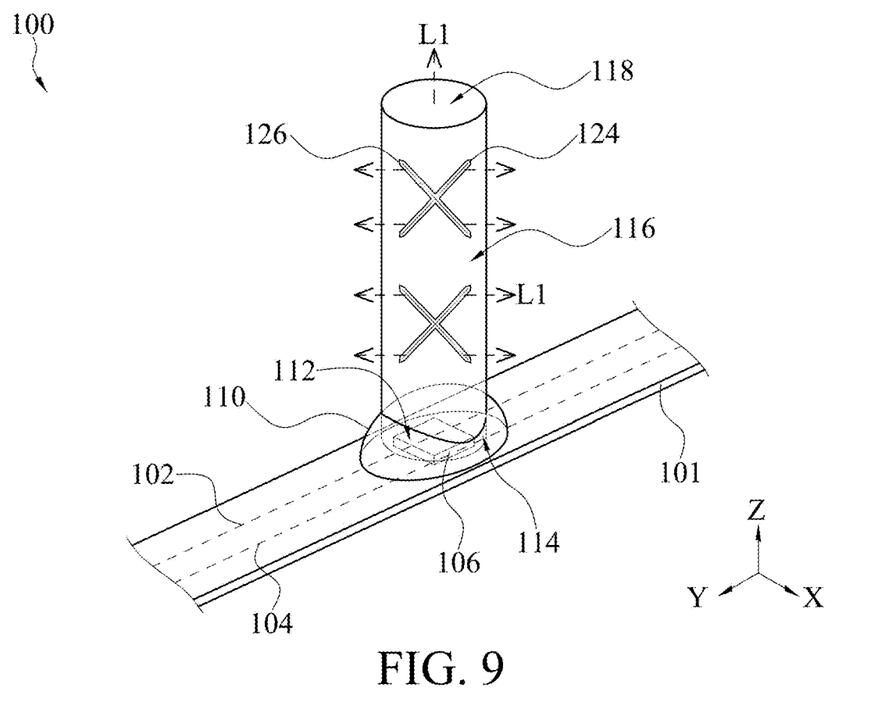
FIG. 9 is a three-dimensional view of a light-emitting diode light string with an optical fiber according to some embodiments of the present invention, showing a first groove intersecting a second groove.

Referring to FIG. 9, FIG. 9 is a three-dimensional view of a light-emitting diode light string with an optical fiber according to some embodiments of the present invention, showing a first groove intersecting a second groove. In some embodiments, as shown in FIG. 9, the first groove 124 of the side light exiting portion 116 intersects the second groove 126. Therefore, when the light L1 passes through the side light exiting portion 116, the entire optical fiber 108 can visually present an optical effect of a cross light shape.

Figure 10A:
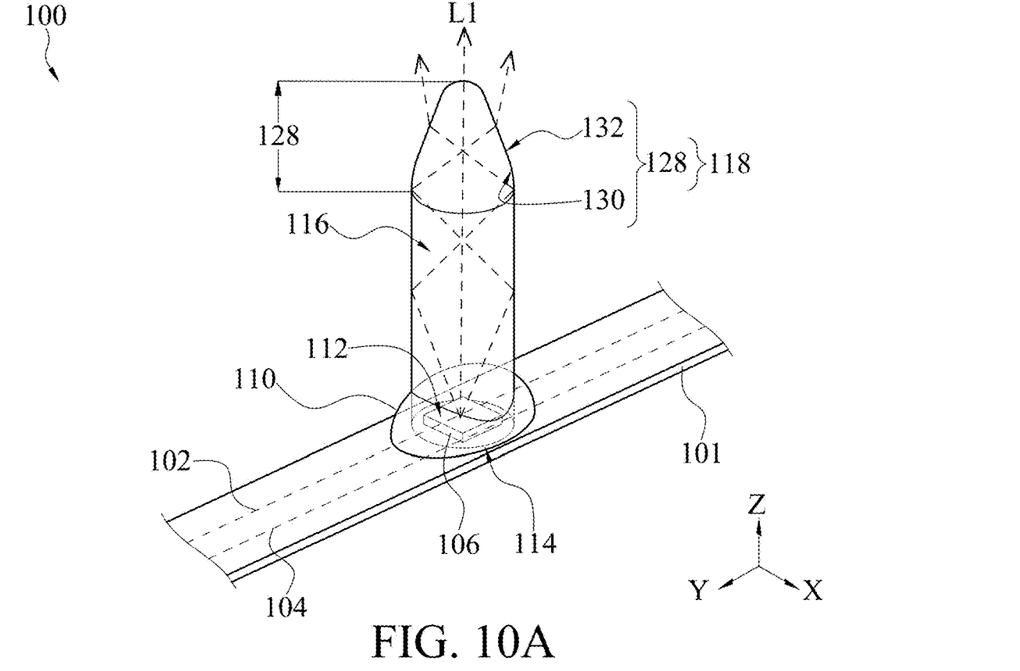
FIG. 10A is a three-dimensional view of a light-emitting diode light string with an optical fiber according to some embodiments of the present invention, showing an example (1) of an optical fiber.

Referring to FIG. 10A, FIG. 10A is a three-dimensional view of a light-emitting diode light string with an optical fiber according to some embodiments of the present invention, showing an example (1) of an optical fiber. In some embodiments, as shown in FIG. 10A, the light exiting end 118 has a protruding portion 128. The protruding portion 128 has a concave surface 130 and a convex surface 132, where the concave surface 130 faces the light-emitting surface 112. The protruding portion 128 is used to aggregate the light L1, so that the light L1 from the light exiting end 118 is concentrated on the convex surface 132, to increase the brightness of the light exiting end 118. In some embodiments, the concave surface 130 and/or the convex surface 132 is a matt surface.

Figure 10B:
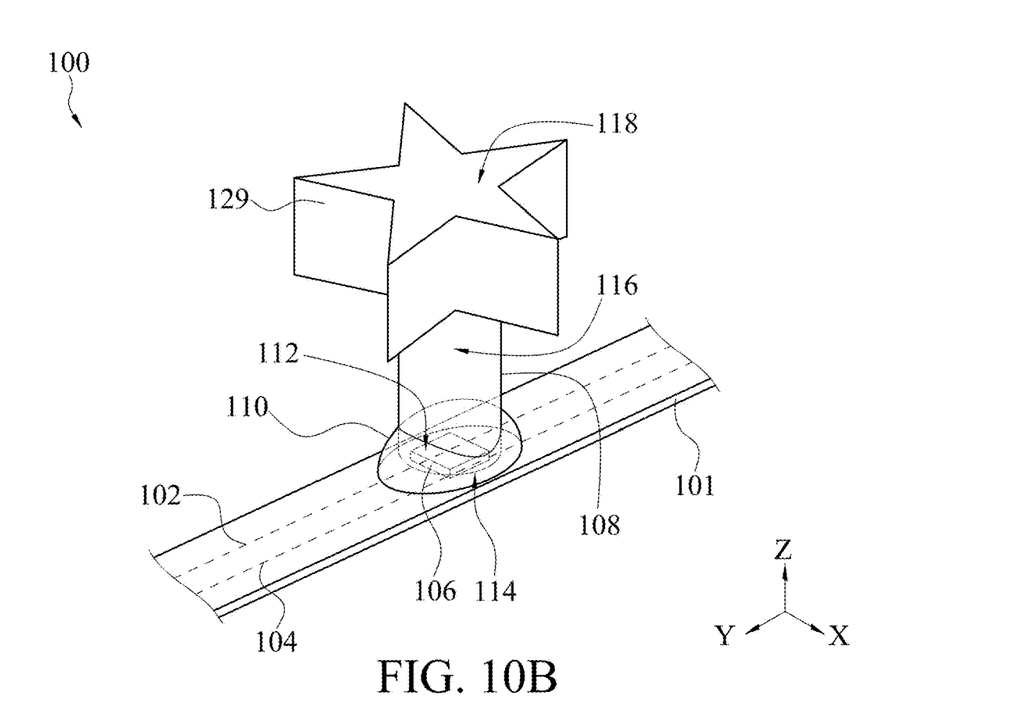
FIG. 10B is a three-dimensional view of a light-emitting diode light string with an optical fiber according to some embodiments of the present invention, showing an example (2) of an optical fiber.

Referring to FIG. 10B, FIG. 10B is a three-dimensional view of a light-emitting diode light string with an optical fiber according to some embodiments of the present invention, showing an example (2) of an optical fiber. In some embodiments, as shown in FIG. 10B, the light exiting end 118 is connected to a light-transmitting member 129, and the light-transmitting member 129 may be made of a transparent material such as a solid colloid or acryl. The light exiting end 118 may emit the light L1 to the light-transmitting member 129, and change a shape of the light through the light-transmitting member 129, to increase a visual effect. In some embodiments, an area of the light-transmitting member 129 is greater than an area of the light exiting end 118.

Figure 11:
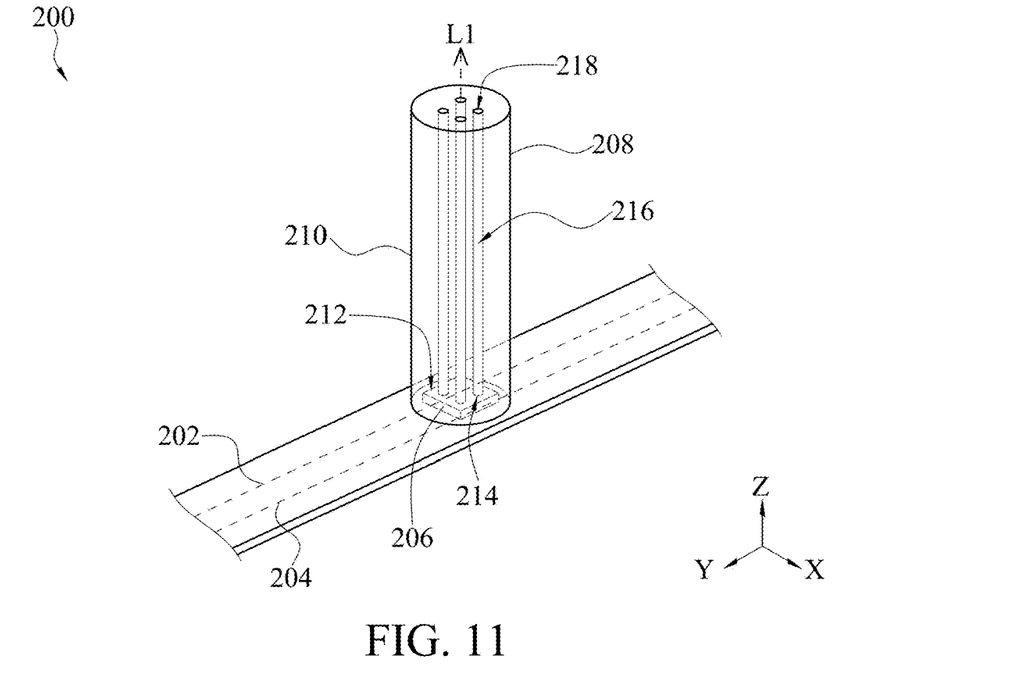
FIG. 11 is a three-dimensional view of a light-emitting diode light string with an optical fiber according to some embodiments of the present invention, showing a plurality of optical fibers being wrapped by a light-transmitting colloid.

Referring to FIG. 11, FIG. 11 is a three-dimensional view of a light-emitting diode light string with an optical fiber according to some embodiments of the present invention, showing a plurality of optical fibers being wrapped by a light-transmitting colloid. In some embodiments, as shown in FIG. 11, a light-emitting diode light string 200 with an optical fiber includes a first wire 202, a second wire 204, a light-emitting diode 206, a plurality of optical fibers 208, and a light-transmitting colloid 210. The light-emitting diode 206 is connected in parallel between the first wire 202 and the second wire 204. The light-emitting diode 206 has a light-emitting surface 212. When activated, the light-emitting diode 206 generates a light L1 on the light-emitting surface 212 to have a first brightness. Each of the plurality of optical fibers 208 includes a light entering end 214, a side light exiting portion 216, and a light exiting end 218. Each light entering end 214 is connected to the light-emitting surface 212. The light-transmitting colloid 210 bonds each light entering end 214 to the light-emitting surface 212. The light L1 has a second brightness at each light exiting end 218, the light L1 has a third brightness at the side light exiting portion 216, the first brightness is substantially equal to the second brightness, and the second brightness is greater than the third brightness.

The first wire 202, the second wire 204, the light-emitting diode 206, and the light-transmitting colloid 210 of the light-emitting diode light string 200 with an optical fiber are similar to those of the light-emitting diode light string 100 with an optical fiber (shown in FIG. 1). Therefore, for descriptions of the first wire 202, the second wire 204, the light-emitting diode 206, and the light-transmitting colloid 210, refer to FIG. 1 to FIG. 4. As shown in FIG. 11, each of the plurality of optical fibers 208 is connected to the light-emitting surface 212, and the light L1 may be emitted to the optical fiber 208 through the light exiting end 218, so that the light L1 may form a plurality of dispersed light spots at the light exiting end 218.

In some embodiments, a diameter of the optical fiber 208 may be determined according to an area of the light-emitting surface 112. For example, for an optical fiber 208 with a small diameter, a larger quantity of optical fibers 208 may be arranged on the light-emitting surface 112.

Figure 12:
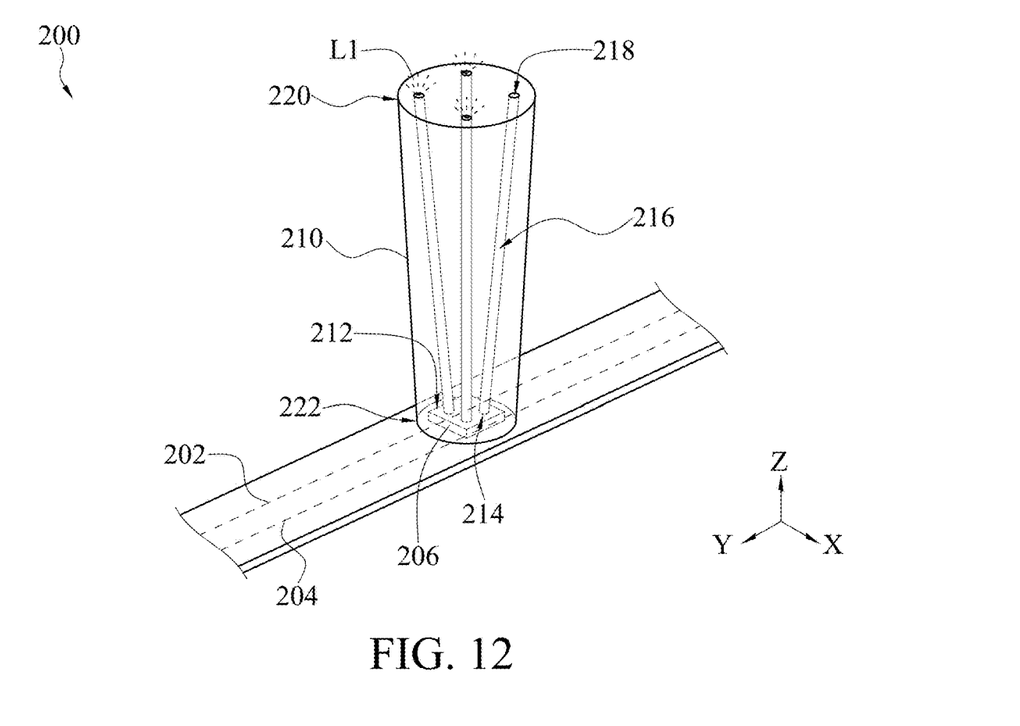
FIG. 12 is a three-dimensional view of a light-emitting diode light string with an optical fiber according to some embodiments of the present invention, showing a plurality of optical fibers arranged radially being wrapped by a light-transmitting colloid.

Referring to FIG. 12, FIG. 12 is a three-dimensional view of a light-emitting diode light string with an optical fiber according to some embodiments of the present invention, showing a plurality of optical fibers arranged radially being wrapped by a light-transmitting colloid. In some embodiments, as shown in FIG. 12, the light-transmitting colloid 210 has a first end 220 and a second end 222. The first end 220 is located at the light entering end 214, and the second end 222 is substantially aligned with the light exiting end 218. A diameter of the first end 220 is less than a diameter of the second end 222, so that the entire light-transmitting colloid 210 is conical. The optical fiber 208 is arranged radially on the light-emitting surface 212. However, the embodiment shown in FIG. 12 is not limited thereto. In some embodiments, the first end 220 is located on the light-emitting surface 212, and the second end 222 may alternatively be located between the light entering end 214 and the light exiting end 218.

Figure 13:
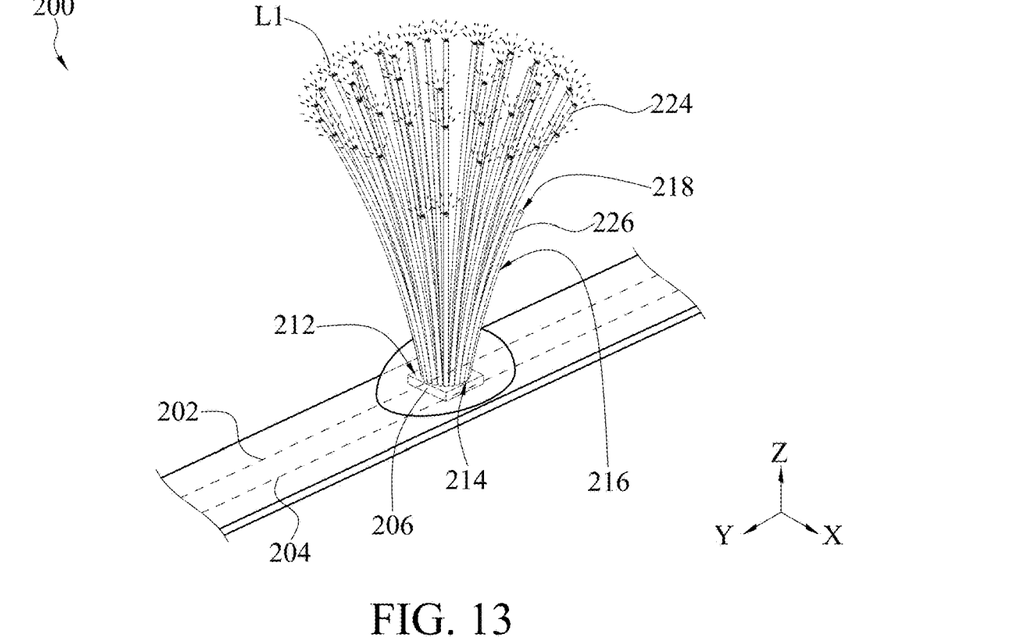
FIG. 13 is a three-dimensional view of a light-emitting diode light string with an optical fiber according to some embodiments of the present invention, showing a plurality of optical fibers arranged radially being exposed to a light-transmitting colloid.

Referring to FIG. 13, FIG. 13 is a three-dimensional view of a light-emitting diode light string with an optical fiber according to some embodiments of the present invention, showing a plurality of optical fibers arranged radially being exposed to a light-transmitting colloid. In some embodiments, as shown in FIG. 13, the plurality of optical fiber 208 include a first optical fiber 224 and a second optical fiber 226. The light-transmitting colloid 210 is wrapped between the light-emitting surface 112 and each light exiting end 118, and a length of the first optical fiber 224 is greater than a length of the second optical fiber 226. Therefore, when the light L1 passes through the light exiting ends 218 of the first optical fiber 224 and the second optical fiber 226 respectively, the first optical fiber 224 and the second optical fiber 226 may present optical effects of light spots with different heights.

Figure 14:
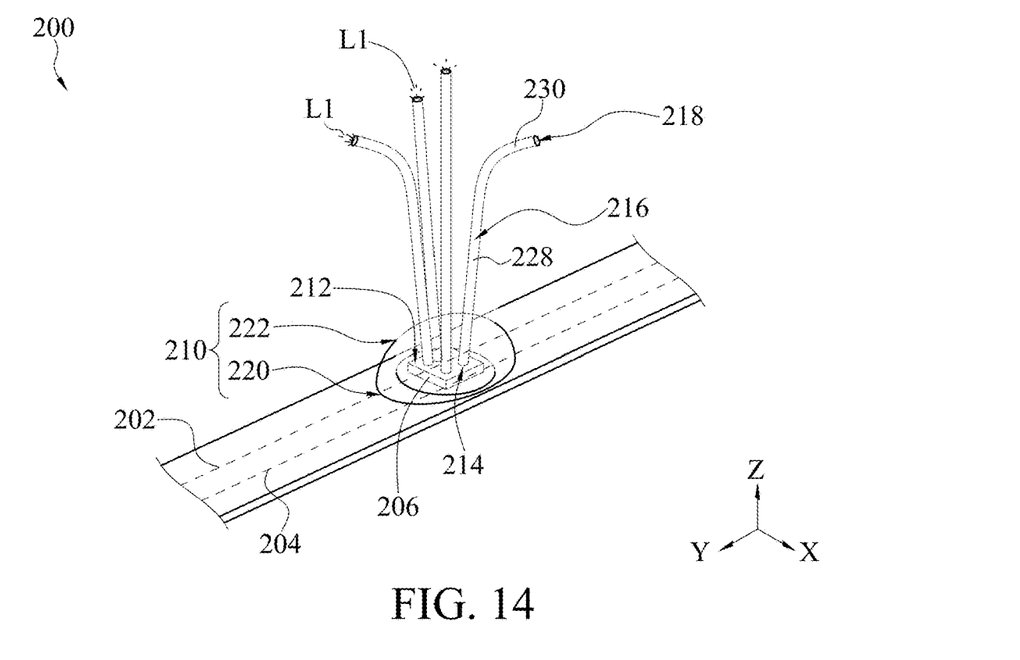
FIG. 14 is a three-dimensional view of a light-emitting diode light string with an optical fiber according to some embodiments of the present invention, showing a bent optical fiber.

Referring to FIG. 14, FIG. 14 is a three-dimensional view of a light-emitting diode light string with an optical fiber according to some embodiments of the present invention, showing a bent optical fiber. In some embodiments, as shown in FIG. 14, the first end 220 of the light-transmitting colloid 210 is adjacent to the light entering end 214, and the second end 222 is located between the light entering end 214 and the light exiting end 218. Each optical fiber 208 further includes a vertical section 228 and a curled section 230. The vertical section 228 is adjacent to the light entering end 214, and the curled section 230 is adjacent to the light exiting end 218. The light-transmitting colloid 210 does not wrap the curled section 230, so that the curled section 230 can be exposed and curled outside the light-transmitting colloid 210 and curled toward an outer side of the light-emitting diode 206. Therefore, the light L1 may be emitted through the light exiting end 218 of the curled section 230 extending toward the outer side.

In conclusion, in some embodiments, a light-emitting diode light string 100 with an optical fiber connects an optical fiber 108 to light-emitting diodes 106, so that the light L1 of the light-emitting diodes 106 can be conducted through the optical fiber 108 to extend a light exiting position. Therefore, under a same light-emitting effect (visual brightness), compared with a conventional light string, the light-emitting diode light string 100 with an optical fiber extends the light exiting position, so as to prevent obstacles (such as the leaves 22 of the Christmas tree) from blocking the light L1 of some of the light-emitting diodes 106, thereby increasing the overall brightness in an arranged environment. In this way, compared with the conventional light string, the light-emitting diode light string 100 with an optical fiber can reduce a total quantity of light-emitting diodes 106, to reduce costs. In the light-emitting diode light string 200 with an optical fiber in some embodiments, an optical fiber 208 with a small diameter may alternatively be arranged in the light-emitting diode 206. Therefore, the light-emitting diode light string 200 with an optical fiber can generate a variable light-emitting effect by changing a quantity, shapes, or lengths of the optical fibers 208.

Certainly, the present invention may further have various other embodiments. A person skilled in the art may make various corresponding changes and modifications according to the present invention without departing from the spirit and essence of the present invention, but such corresponding changes and modifications shall fall within the protection scope of the appended claims of the present invention.

What is claimed is:

1. A light-emitting diode light string with an optical fiber, comprising:
    a first wire;
    a second wire;
    a light-emitting diode, connected in parallel between the first wire and the second wire, wherein the light-emitting diode has a light-emitting surface and a side surface, and the light-emitting diode is a micro light emitting diode (LED), a quantum dot light emitting diode (QLED), or a mini LED;
    an optical fiber, having a light entering end, a light exiting end, and a side light exiting portion, wherein the light entering end is connected to the light-emitting surface, and the light entering end, the light exiting end, and the light-emitting surface are substantially aligned with a plumb line; and
    a light-transmitting colloid, bonding the light entering end to the light-emitting surface to make the light entering end in direct contact with the light-emitting surface,
    wherein the light-emitting surface is fully covered by the light entering end of the optical fiber, and the side surface of the light-emitting diode is covered only by the light-transmitting colloid,
    wherein when the light-emitting diode is activated, a light generated at the light-emitting surface has a first brightness and passes through the light-transmitting colloid, the light has a second brightness at the light exiting end, and the light has a third brightness at the side light exiting portion, and
    wherein the first brightness is substantially equal to the second brightness, and the second brightness is greater than the third brightness.

2. The light-emitting diode light string with an optical fiber according to claim 1, wherein the optical fiber has a plurality of optical structures, each of the optical structures is located at the light exiting end, and the light passes through the plurality of optical structures to form a scattered light.

3. The light-emitting diode light string with an optical fiber according to claim 1, wherein the optical fiber has a plurality of optical structures, each of the optical structures is located at the side light exiting portion, and the light passes through the plurality of optical structures to form a scattered light.

4. The light-emitting diode light string with an optical fiber according to claim 1, wherein the side light exiting portion has a first groove and a second groove, and the first groove is parallel to the second groove.

5. The light-emitting diode light string with an optical fiber according to claim 1, wherein the side light exiting portion has a first groove and a second groove, and the first groove intersects the second groove.

6. The light-emitting diode light string with an optical fiber according to claim 1, wherein the light exiting end has a convex surface and a concave surface, and the concave surface faces the light-emitting surface.

7. The light-emitting diode light string with an optical fiber according to claim 1, wherein a plurality of optical fibers are provided, and the light entering end of each of the optical fibers is connected to the light-emitting surface.

8. The light-emitting diode light string with an optical fiber according to claim 7, wherein the plurality of optical fibers comprise a first optical fiber and a second optical fiber, and a length of the first optical fiber is greater than a length of the second optical fiber.

9. The light-emitting diode light string with an optical fiber according to claim 7, wherein the light-transmitting colloid has a first end and a second end, the first end is adjacent to the light entering end, the second end is located between the light entering end and the light exiting end, each of the optical fibers has a vertical section and a curled section, the vertical section is adjacent to the light entering end, and the curled section is adjacent to the light exiting end.

10. The light-emitting diode light string with an optical fiber according to claim 1, wherein the light exiting end is connected to a light-transmitting member, and an area of the light-transmitting member is greater than an area of the light exiting end.

* * * * *